United States Patent
Deguchi

(10) Patent No.: US 12,054,591 B2
(45) Date of Patent: Aug. 6, 2024

(54) POLY(ARYLENE SULFIDE) RESIN COMPOSITION, MOLDED ARTICLE, COMPOSITE MOLDED ARTICLE, AND METHODS RESPECTIVELY FOR PRODUCING SAID PRODUCTS

(71) Applicant: DIC Corporation, Tokyo (JP)

(72) Inventor: Yuki Deguchi, Ichihara (JP)

(73) Assignee: DIC Corporation, Tokyo (JP)

( * ) Notice: Subject to any disclaimer, the term of this patent is extended or adjusted under 35 U.S.C. 154(b) by 959 days.

(21) Appl. No.: 17/049,765

(22) PCT Filed: Apr. 18, 2019

(86) PCT No.: PCT/JP2019/016588
§ 371 (c)(1),
(2) Date: Oct. 22, 2020

(87) PCT Pub. No.: WO2019/208374
PCT Pub. Date: Oct. 31, 2019

(65) Prior Publication Data
US 2021/0238371 A1 Aug. 5, 2021

(30) Foreign Application Priority Data
Apr. 25, 2018 (JP) .................. 2018-084008

(51) Int. Cl.
*B29C 65/00* (2006.01)
*C08J 5/12* (2006.01)
*C08L 63/00* (2006.01)
*C08L 81/02* (2006.01)
*C08L 91/06* (2006.01)
*B29C 65/48* (2006.01)
*B32B 27/08* (2006.01)

(52) U.S. Cl.
CPC .............. *C08J 5/12* (2013.01); *C08L 63/00* (2013.01); *C08L 81/02* (2013.01); *C08L 91/06* (2013.01); *B29C 65/485* (2013.01); *B32B 27/08* (2013.01); *C08L 2201/08* (2013.01); *C08L 2203/30* (2013.01); *C08L 2205/03* (2013.01)

(58) Field of Classification Search
CPC ............ B29C 65/485; C08J 5/12; C08L 63/00
See application file for complete search history.

(56) References Cited

U.S. PATENT DOCUMENTS

| | | | |
|---|---|---|---|
| 2015/0080498 A1 | 3/2015 | Uchigata et al. | |
| 2015/0080507 A1 | 3/2015 | Koyanagi | |
| 2019/0233644 A1 | 8/2019 | Yamaguchi | |

FOREIGN PATENT DOCUMENTS

| | | |
|---|---|---|
| CN | 104204098 A | 12/2014 |
| EP | 2829578 A1 | 1/2015 |
| EP | 3231844 A1 | 10/2017 |
| JP | 4873117 B2 | 2/2012 |
| WO | 2007/058332 A1 | 5/2007 |
| WO | 13/141364 A1 | 9/2013 |
| WO | 2018/016411 A1 | 1/2018 |
| WO | 2018/056240 A1 | 3/2018 |

*Primary Examiner* — Philip C Tucker
*Assistant Examiner* — Nickolas R Harm
(74) *Attorney, Agent, or Firm* — Locke Lord LLP; James E. Armstrong, IV; Nicholas J. DiCeglie, Jr.

(57) ABSTRACT

Provided are a polyarylene sulfide resin composition which can provide a composite molded article; a molded article produced from the polyarylene sulfide resin composition; and methods respectively for producing the polyarylene sulfide resin composition and the molded article thereof. More specifically provided are a composite molded article obtained by bonding a molded article which is produced by molding a polyarylene sulfide resin composition and is subjected to an annealing treatment to a cured product produced from a curable resin composition containing an epoxy resin, wherein the polyarylene sulfide resin composition contains, as essential components, an epoxy resin and an olefin wax containing a carboxyl group and a carboxylic acid anhydride group and having an acid value of 65 to 150 [mgKOH/g]; a polyarylene sulfide resin composition for providing the composite molded article; a molded article; and methods respectively for producing the aforementioned products.

15 Claims, No Drawings

POLY(ARYLENE SULFIDE) RESIN COMPOSITION, MOLDED ARTICLE, COMPOSITE MOLDED ARTICLE, AND METHODS RESPECTIVELY FOR PRODUCING SAID PRODUCTS

TECHNICAL FIELD

The present invention relates to a polyarylene sulfide resin composition, a molded article, a composite molded article, and methods respectively for producing the aforementioned products.

BACKGROUND ART

It is known that a polyarylene sulfide (hereinafter may be abbreviated as "PAS") resin represented by polyphenylene sulfide (hereinafter may be abbreviated as "PPS") resin has a high melting point and excellent heat resistance, and is also excellent in mechanical strength, chemical resistance, moldability, and dimensional stability. Therefore, in general, additives such as fillers and elastomers are blended into the PAS resin and melt-kneaded so that they are dispersed in a matrix made of the PAS resin to form a PAS resin composition, and then the PAS resin composition is melt-molded and processed into a molded article used as an electric and/or electronic appliance part, an automobile part, etc.

Further, these parts are frequently bonded to part materials composed of epoxy resins and the like while these parts undergo secondary processing. However, polyarylene sulfide resins have relatively poor adhesiveness to other resins, in particular, epoxy resins. Therefore, for example, when polyarylene sulfides are bonded to each other or when a polyarylene sulfide resin is bonded to another material with an epoxy-based adhesive, or when sealing of electric and electronic parts is performed by using an epoxy resin, the poor adhesiveness (hereinafter may be referred to as epoxy resin adhesiveness) of the polyarylene sulfide resin to a curable resin composition containing an epoxy resin has posed a problem.

Therefore, a resin composition, which was obtained by blending a polyarylene sulfide resin with a polyolefin having an acid value of 65 to 150 [mgKOH/g] and containing a carboxyl group and a carboxylic acid anhydride group, and a molded article obtained by molding the resin composition have been proposed for a purpose of improving the epoxy adhesiveness of the PAS resin (Patent Literature 1).

However, when the molded article is subjected to an annealing treatment in order to relieve distortion and stress of the resin during melt molding, the epoxy resin adhesiveness tends to be lowered due to the annealing treatment even if excellent epoxy resin adhesiveness has been obtained before the annealing treatment.

CITATION LIST

Patent Literature

PTL 1: WO2013/141364

SUMMARY OF INVENTION

Technical Problem

Therefore, an object of the invention is to provide a polyarylene sulfide resin composition that can suppress a decrease in epoxy resin adhesiveness even after an annealing treatment as compared with that before the annealing treatment, a molded article produced from the polyarylene sulfide resin composition having excellent epoxy adhesive strength after the annealing treatment, and further, a composite molded article having excellent adhesiveness, which is formed by bonding the molded article to a cured product of a curable resin composition containing an epoxy resin, and methods respectively for producing the aforementioned products.

Solution to Problem

The inventors of the invention have conducted intensive studies and found that the aforementioned object can be achieved by using a polyarylene sulfide resin composition obtained by blending a polyarylene sulfide resin with, as essential components, an epoxy resin, and an olefin wax containing a carboxyl group and a carboxylic acid anhydride group and having an acid value of 65 to 150 [mgKOH/g]. Thus, the inventors have completed the present invention.

That is, the invention relates to a method for producing a composite molded article obtained by bonding a molded article obtained by molding a polyarylene sulfide resin composition to a cured product produced from a curable resin composition containing an epoxy resin, the method including a step (1) of subjecting the molded article to an annealing treatment, and a step (2) of bonding the annealed molded article and the cured product to each other, wherein the polyarylene sulfide resin composition is obtained by blending and melt-kneading, as essential components, a polyarylene sulfide resin (A), an epoxy resin (B), and an olefin wax (C) containing a carboxyl group and a carboxylic acid anhydride group and having an acid value of 65 [mgKOH/g] to 150 [mgKOH/g], and with respect to 100 parts by mass of the polyarylene sulfide resin (A), the epoxy resin (B) is in a range of 1 to 250 parts by mass, and the olefin wax (C) is in a range of 0.01 to 5 parts by mass.

The invention relates to a composite molded article obtained by bonding a molded article obtained by molding a polyarylene sulfide resin composition to a cured product produced from a curable resin composition containing an epoxy resin, wherein the molded article is one subjected to an annealing treatment;

the polyarylene sulfide resin composition is obtained by blending, as essential components, a polyarylene sulfide resin (A), an epoxy resin (B), and an olefin wax (C) containing a carboxyl group and a carboxylic acid anhydride group and having an acid value of 65 [mgKOH/g] to 150 [mgKOH/g]; and with respect to 100 parts by mass of the polyarylene sulfide resin (A), a content of the epoxy resin (B) is in a range of 1 to 250 parts by mass, and a content of the olefin wax (C) is in a range of 0.01 to 5 parts by mass.

The invention relates to a polyarylene sulfide resin composition, wherein the polyarylene sulfide resin composition is obtained by blending, as essential components, a polyarylene sulfide resin (A), an epoxy resin (B), and an olefin wax (C) containing a carboxyl group and a carboxylic acid anhydride group and having an acid value of 65 [mgKOH/g] to 150 [mgKOH/g], and, with respect to 100 parts by mass of the polyarylene sulfide resin (A), a content of the epoxy resin (B) is in a range of 1 to 250 parts by mass, and a content of the olefin wax (C) is in a range of 0.01 to 5 parts by mass.

The present invention relates to a method for producing a polyarylene sulfide resin composition, including blending and melt-kneading, as essential components, a polyarylene sulfide resin (A), an epoxy resin (B), and an olefin wax (C) containing a carboxyl group and a carboxylic acid anhydride group and having an acid value of 65 [mgKOH/g] to 150 [mgKOH/g], wherein, with respect to 100 parts by mass of the polyarylene sulfide resin (A), a content of the epoxy resin (B) is in a range of 1 to 250 parts by mass, and a content of the olefin wax (C) is in a range of 0.01 to 5 parts by mass.

Advantageous Effects of Invention

According to the invention, a polyarylene sulfide resin composition that can suppress a decrease in epoxy resin adhesiveness even after an annealing treatment as compared with that before the annealing treatment, a molded article produced from the polyarylene sulfide resin composition having excellent epoxy adhesive strength after the annealing treatment, and further, a composite molded article having excellent adhesiveness, which is formed by bonding the molded article to a cured product of a curable resin composition containing an epoxy resin, and methods respectively for producing the aforementioned products can be provided.

DESCRIPTION OF EMBODIMENTS

The polyarylene sulfide resin composition used in the invention contains, as essential components, a polyarylene sulfide resin (A), an epoxy resin (B), and an olefin wax (C) containing a carboxyl group and a carboxylic acid anhydride group and having an acid value of 65 [mgKOH/g] to 150 [mgKOH/g], wherein, with respect to 100 parts by mass of the polyarylene sulfide resin (A), the epoxy resin (B) is in a range of 1 to 250 parts by mass, and the olefin wax (C) is in a range of 0.01 to 5 parts by mass.

The polyarylene sulfide resin composition used in the invention contains the polyarylene sulfide resin (A) as an essential component. The polyarylene sulfide resin used in the invention has a resin structure having, as a repeating unit, a structure in which an aromatic ring and a sulfur atom are bonded to each other. To be specific, the polyarylene sulfide resin is a resin that includes, as a repeating unit, a structural moiety represented by Formula (1) below:

[Chem. 1]

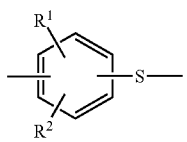

Formula (1)

(In the formula, $R^1$ and $R^2$ each independently represent a hydrogen atom, an alkyl group having 1 to 4 carbon atoms, a nitro group, an amino group, a phenyl group, a methoxy group, or an ethoxy group.), and, as necessary, a trifunctional structural moiety represented by Formula (2) below:

[Chem. 2]

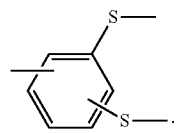

Formula (2)

The trifunctional structural moiety represented by Formula (2) is preferably in a range of 0.001 mol % to 3 mol %, and particularly preferably in a range of 0.01 mol % to 1 mol %, with respect to a total number of moles of the trifunctional structural moiety and other structural sites.

Here, the structural moieties represented by Formula (1), especially $R^1$ and $R^2$ in Formula (1) are preferably hydrogen atoms from the viewpoint of mechanical strength of the polyarylene sulfide resin. In such a case, examples thereof include a structure formed by bonding at a para position represented by Formula (3) below and a structure formed by bonding at a meta position represented by Formula (4) below.

[Chem. 3]

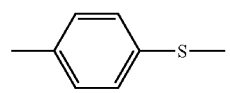

Formula (3)

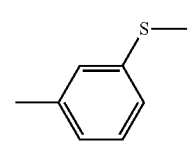

Formula (4)

Among them, particularly, a structure in which the sulfur atom is bonded to the aromatic ring in the repeating unit at a para position represented by Formula (3) is preferable from the viewpoints of heat resistance and crystallinity of the polyarylene sulfide resin.

Further, the polyarylene sulfide resin may include not only the structural moieties represented by Formulae (1) and (2) but also structural moieties represented by Structural Formulae (5) to (8) below such that the amount of the structural moieties represented by Structural Formulae (5) to (8) is 30 mol % or less of a total of the structural moieties represented by Structural Formulae (5) to (8) and the structural moieties represented by Formulae (1) and (2).

[Chem. 4]

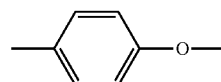

Formula (5)

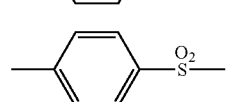

Formula (6)

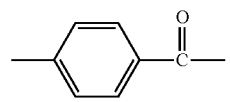

Formula (7)

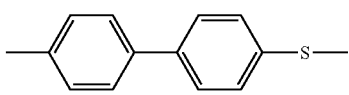
Formula (8)

In particular, in the invention, the amount of the structural moieties represented by Formulae (5) to (8) above is preferably 10 mol % or less from the viewpoints of heat resistance and mechanical strength of the polyarylene sulfide resin. When the polyarylene sulfide resin includes the structural moieties represented by Formulae (5) to (8) above, the bonding thereof may take a form of a random copolymer or a block copolymer.

Moreover, the polyarylene sulfide resin may include, in its molecular structure, a naphthyl sulfide bond, or the like, and the amount thereof is preferably 3 mol % or less and particularly preferably 1 mol % or less with respect to a total number of moles of the naphthyl sulfide bond and other structural sites.

In addition, the physical properties of the polyarylene sulfide resin are as follows, although they are not particularly limited as long as the effects of the invention are not impaired.

(Melt Viscosity)

The melt viscosity of the polyarylene sulfide resin used in the invention is not particularly limited. However, the melt viscosity (V6) measured at 300° C. is preferably in a range of 2 [Pa·s] to 1000 [Pa·s], more preferably in a range of 10 [Pa·s] to 500 [Pa·s] from the viewpoints of good balance of flowability and mechanical strength, particularly preferably in a range of 60 [Pa·s] to 200 [Pa·s]. In the invention, the melt viscosity (V6) is a value obtained by measuring the melt viscosity of a polyarylene sulfide resin with a flow tester, CFT-500D produced by Shimadzu Corporation after the resin was retained for 6 minutes at a temperature of 300° C., a load of $1.96 \times 10^6$ Pa and with L/D=10 (mm)/1 (mm).

(Non-Newton Index)

The non-Newton index of the polyarylene sulfide resin (A) used in the invention is not particularly limited as long as the effects of the invention are not impaired; however, the non-Newton index is preferably in a range of 0.90 to 2.00. When a linear polyarylene sulfide resin is used, the non-Newton index is preferably in a range of 0.90 to 1.50, and more preferably in a range of 0.95 to 1.20. Such a polyarylene sulfide resin has excellent mechanical properties, flowability, and wear resistance. The non-Newton index (N value) is a value calculated from the equation below from shear rate and shear stress measured with a capilograph at 300° C. and an orifice length (L)/orifice diameter (D) ratio, that is, L/D, of 40.

$$SR = K \cdot SS^N \qquad \text{[Math. 1]}$$

[where SR represents shear rate ($sec^{-1}$), SS represents shear stress ($dyne/cm^2$), and K represents a constant.] The closer the N value is to 1, the more linear the structure of the PPS. The higher the N value, the more branched the structure.

(Producing Method)

The method for producing the polyarylene sulfide resin (A) is not particularly limited. However, examples thereof include 1) a method of polymerizing a dihalogeno aromatic compound, as necessary, with the addition of a polyhalogeno aromatic compound or other copolymerization components, in the presence of sulfur and sodium carbonate; 2) a method of polymerizing a dihalogeno aromatic compound, as necessary, with the addition of a polyhalogeno aromatic compound or other copolymerization components, in the presence of a sulfidizing agent or the like in a polar solvent; and 3) a method of self-condensing p-chlorothiophenol, as necessary, with the addition of other copolymerization components. Among these methods, the method 2) is widely used and preferable. During the reaction, an alkali metal salt of a carboxylic acid or a sulfonic acid, or an alkali hydroxide may be added to adjust a polymerization degree. In particular, a product obtained by any of the following methods of the method 2) above is preferable: a method for producing a polyarylene sulfide resin in which a hydrogenated sulfidizing agent is introduced into a mixture containing a heated organic polar solvent and a dihalogeno aromatic compound at a rate at which water can be removed from the reaction mixture so as to allow the dihalogeno aromatic compound to react with the sulfidizing agent in the organic polar solvent, as necessary, with the addition of a polyhalogeno aromatic compound, and the water content in the reaction system is controlled within a range of 0.02 mol to 0.5 mol with respect to 1 mole of the organic polar solvent (see JP-A-07-228699); and a method of reacting a dihalogeno aromatic compound with an alkali metal hydrosulfide and an organic acid alkali metal salt in the presence of a solid alkali metal sulfide and an aprotic polar organic solvent, as necessary, with the addition of a polyhalogeno aromatic compound or other copolymerization components while controlling the amount of the organic acid alkali metal salt to be in a range of 0.01 to 0.9 mol with respect to 1 mole of the sulfur source and controlling the water content in the reaction system to be 0.02 mol or less with respect to 1 mole of the aprotic polar organic solvent (see WO2010/058713). Specific examples of the dihalogeno aromatic compound include p-dihalobenzene, m-dihalobenzene, o-dihalobenzene, 2,5-dihalotoluene, 1,4-dihalonaphthalene, 1-methoxy-2,5-dihalobenzene, 4,4'-dihalobiphenyl, 3,5-dihalobenzoic acid, 2,4-dihalobenzoic acid, 2,5-dihalonitrobenzene, 2,4-dihalonitrobenzene, 2,4-dihaloanisole, p,p'-dihalodiphenyl ether, 4,4'-dihalobenzophenone, 4,4'-dihalodiphenylsulfone, 4,4'-dihalodiphenyl sulfoxide, 4,4'-dihalodiphenyl sulfide, and a compound having an alkyl group having 1 to 18 carbon atoms on the aromatic ring of each of the above compounds. Examples of the polyhalogeno aromatic compound include 1,2,3-trihalobenzene, 1,2,4-trihalobenzene, 1,3,5-trihalobenzene, 1,2,3,5-tetrahalobenzene, 1,2,4,5-tetrahalobenzene, and 1,4,6-trihalonaphthalene. In addition, the halogen atom contained in each of the above compounds is desirably a chlorine atom or a bromine atom.

The method for post-treating the reaction mixture containing the polyarylene sulfide resin obtained by the polymerization process is not particularly limited. However, examples thereof include (1) a method including: first distilling away the solvent from the reaction mixture under reduced pressure or ordinary pressure after addition or no addition of an acid or a base after the completion of the polymerization reaction, then rinsing the solids after the distillation of the solvent with a solvent such as water, a reaction solvent (or an organic solvent having a solubility comparable to that of a low-molecular polymer), acetone, methyl ethyl ketone, and alcohols one or more times, neutralizing, water washing, filtering, and drying; (2) a method including: precipitating solid products of polyarylene sulfide, mineral salt and the like by adding, as a precipitation agent, a solvent (which is soluble in the used polymerization solvent, and is a poor solvent with respect to at least the polyarylene sulfide) such as water, acetone, methyl ethyl ketone, alcohols, ethers, halogenated hydrocarbon, aromatic hydrocarbon, and aliphatic hydrocarbon to the reaction mixture after the completion of the polymerization reaction, filtering, rinsing, and drying; (3) a method including: adding a reaction solvent (or an organic solvent having a solubility comparable to that of a low-molecular polymer) to the reaction mixture after the completion of the polymerization reaction, followed by stirring, filtering to remove the low-molecular-weight polymer, then performing rinsing with a solvent such as water, acetone, methyl ethyl ketone, and alcohols one or more times, then neutralizing, water washing, filtering, and drying; (4) a method including: water washing by adding water to the reaction mixture after the completion of the polymerization reaction, filtering, performing an acid treatment by adding an acid during the water washing as necessary, and drying; and (5) a method including: filtering the reaction mixture after the completion of the polymerization reaction, performing rinsing with a reaction solvent one or more times as necessary, further water washing, filtering, and drying.

In the post-treatment methods exemplified in (1) to (5) above, the polyarylene sulfide resin may be dried in vacuum, air, or an inert gas atmosphere such as nitrogen.

The polyarylene sulfide resin composition of the invention contains the epoxy resin (B) as an essential component.

The epoxy resin used in the invention is not particularly limited as long as the effects of the invention are not impaired, and examples thereof include a bisphenol type epoxy resin, a novolac type epoxy resin, and an epoxy resin having a polyarylene ether structure (α). Among these resins, the bisphenol type epoxy resin is preferable because it has excellent adhesiveness. From the viewpoint of suppressing deterioration of epoxy resin adhesiveness, especially deterioration of epoxy resin adhesiveness after an annealing treatment, and reducing the amount of gas generation during melting, and further, from the viewpoint of excellent thermal shock resistance, especially excellent thermal shock resistance in the TD direction as well as thermal shock resistance in the case of having a weld portion, the epoxy equivalent of the epoxy resin used in the invention is preferably 5000 [g/eq.] or less, more preferably 2400 [g/eq.] or less, further preferably 2100 [g/eq.] or less, and particularly preferably 1900 [g/eq.] or less. Moreover, from the viewpoint of excellent flowability, the epoxy equivalent is preferably 100 [g/eq.] or more, more preferably 190 [g/eq.] or more, and further preferably 210 [g/eq.] or more.

Examples of the epoxy resin of the bisphenol type epoxy resin include bisphenol type glycidyl ethers, and specific examples thereof include a bisphenol A type epoxy resin, a bisphenol F type epoxy resin, a biphenyl type epoxy resin, a tetramethylbiphenyl type epoxy resin, a bisphenol S type epoxy resin, a bisphenol AD type epoxy resin, and a tetrabromobisphenol A type epoxy resin. In the case of a bisphenol type epoxy resin, from the viewpoint of suppressing deterioration of epoxy resin adhesiveness, especially deterioration of epoxy resin adhesiveness after an annealing treatment, and reducing the amount of gas generation during melting, and further, from the viewpoint of excellent thermal shock resistance, especially excellent thermal shock resistance in the TD direction as well as thermal shock resistance in the case of having a weld portion, the epoxy equivalent is preferably 5000 [g/eq.] or less, more preferably 2400 [g/eq.] or less, further preferably 2100 [g/eq.] or less, and particularly preferably 1900 [g/eq.] or less. Moreover, from the viewpoint of excellent flowability, the epoxy equivalent is preferably 100 [g/eq.] or more, more preferably 190 [g/eq.] or more, and further preferably 210 [g/eq.] or more.

Further, examples of the novolac type epoxy resin include novolac type epoxy resins that are produced by reacting, with epi-halohydrin, a novolac type phenol resin produced by a condensation reaction of a phenol and an aldehyde. Specific examples of the novolac type epoxy resins include a phenol novolac type epoxy resin, a cresol novolac type epoxy resin, a naphthol novolac type epoxy resin, a naphthol-phenol co-condensation novolac type epoxy resin, a naphthol-cresol co-condensation novolac type epoxy resin, and a brominated phenol novolac type epoxy resin. When the epoxy resin is a novolac type epoxy resin, from the viewpoint of suppressing deterioration of epoxy resin adhesiveness, especially deterioration of epoxy resin adhesiveness after an annealing treatment, and reducing the amount of gas generation during melting, and further, from the viewpoint of excellent thermal shock resistance, especially excellent thermal shock resistance in the TD direction as well as thermal shock resistance in the case of having a weld portion, the epoxy equivalent is preferably 300 [g/eq.] or less, and more preferably 250 [g/eq.] or less. Moreover, from the viewpoint of excellent flowability, the epoxy equivalent is preferably 100 [g/eq.] or more, and more preferably 190 [g/eq.] or more. In the invention, the epoxy equivalent refers to a value measured in accordance with JIS K 7236 (2001).

In the epoxy resin used in the invention, when a component which acts as a so-called curing agent (hereinafter referred to as a curing agent acting component) such as a phenol resin, an amine (active hydrogen compound) and a carboxylic acid anhydride is present, the epoxy group disappears due to curing reaction (addition reaction with an active hydrogen compound, co-polycondensation reaction with an acid anhydride) during melt-kneading. Therefore, the ratio of the curing agent acting component in the polyarylene sulfide resin composition is, with respect to a total 1 equivalent of the epoxy group in the epoxy resin component, 0.1 equivalents or less, more preferably 0.01 equivalents or less, and most preferably 0 equivalent, that is, absent (equal to or lower than the a minimum detectable quantity).

The blending ratio of the epoxy resin in the polyarylene sulfide resin composition of the invention is not particularly limited as long as the effects of the invention are not impaired. However, from the viewpoints of suppressing deterioration of epoxy resin adhesiveness, especially deterioration of epoxy resin adhesiveness after an annealing treatment, and improving heat resistance, mechanical strength, especially thermal shock resistance and dimensional stability, with respect to 100 parts by mass of the polyarylene sulfide resin, the amount of the epoxy resin is preferably 1 part by mass or more, more preferably 2 parts by mass or more, and further preferably 5 parts by mass or more. On the other hand, from the viewpoint of improving flowability, the amount of the epoxy resin is preferably 30 parts by mass or less, more preferably 15 parts by mass or less, and further preferably 10 parts by mass or less.

Further, from the viewpoints of epoxy resin adhesiveness and thermal shock resistance, especially improving thermal shock resistance in the TD direction as well as thermal shock resistance in the case of having a weld portion, the epoxy resin is blended in the polyarylene sulfide resin composition of the invention such that, with respect to 1 g of the polyarylene sulfide resin composition, the ratio of the epoxy group derived from the epoxy resin is preferably 1 [μmol] or more, more preferably 5 [μmol] or more, further preferably 10 [μmol] or more, particularly preferably 20 [μmol], and preferably 500 [μmol] or less, more preferably 350 [μmol] or less, further preferably 300 [μmol] or less, and particularly preferably 250 [μmol] or less.

The polyarylene sulfide resin composition of the invention contains, as an essential component, the olefin wax (C)

having a carboxyl group and a carboxylic acid anhydride group (—CO—O—CO—) and having an acid value of 65 to 150 [mgKOH/g] (hereinafter may be simply abbreviated as olefin wax (C)).

The olefin wax (C) used in the invention is a wax having an olefin structure having polar groups including the carboxyl group and the carboxylic anhydride group and non-polar groups including olefin. Accordingly, during molding, the polar groups align on a resin molded product side and the non-polar groups align on a mold side, and as a result, the olefin wax (C) acts as a releasing agent. In the invention, a wax refers to a low-molecular-weight resin usually solid at 25° C. produced by polymerization and exhibiting a releasing effect as an additive for a polyarylene sulfide resin composition. Typically, the molecular weight (Mn) is in a range of 250 or more, preferably 300 or more, and 10000 or less, preferably 7000 or less. When the molecular weight is less than 250, evaporation easily occurs from the vacuum vent during melt-kneading or the like, and thus it is difficult for the wax to exhibit the releasing effect. Moreover, during molding, excessive bleed-out of the wax may occur, resulting in soiling of the mold. On the other hand, when the molecular weight exceeds 10,000, bleed-out rarely occurs and the releasing effect is sometimes reduced.

An example of the olefin wax (C) containing a carboxyl group and a carboxylic anhydride group used in the invention is a compound obtained by post-treating an olefin wax (c) to introduce a carboxyl group and a carboxylic anhydride group and the olefin wax (C) is preferably a compound modified by a post-treatment using maleic acid and/or maleic anhydride. The olefin wax (c) is preferably a polyethylene wax and/or a 1-alkene polymer since an excellent mold releasing effect is obtained. Any currently known method for producing a polyethylene wax may be employed. For example, ethylene may be polymerized at a high temperature and under a high pressure, a polyethylene may be thermally decomposed, or a low-molecular-weight component may be isolated and purified from a polyethylene polymer. Another example of the olefin wax (C) is a compound obtained by copolymerizing a compound containing a carboxyl group and/or a carboxylic anhydride group copolymerizable with monomers used in polymerization or copolymerization of ethylene and/or 1-alkene, and is preferably a compound obtained by copolymerizing maleic anhydride or maleic anhydride and maleic acid. Such a product of copolymerization is preferable since the carboxyl group and the carboxylic anhydride group are stable and are contained in high concentrations. Examples of the 1-alkene include propylene, 1-butene, 1-pentene, 1-hexene, 1-heptene, 1-octene, 1-nonene, 1-decene, 1-dodecene, 1-tetradecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, and 1-nonacosene. The aliphatic hydrocarbon group constituting the olefin wax (B) used in the invention may be linear or branched or may contain an unsaturated bond, an ester bond, or an ether bond in some part. Specific examples of the olefin wax (B) include DIACARNA 3 (Mitsubishi Chemical Corporation) and LICOLUB CE2 (Clariant Japan).

The acid value of the olefin wax (C) used in the invention is 65 mgKOH/g or more, preferably 70 mgKOH/g or more, and more preferably 75 mgKOH/g or more, and 150 mgKOH/g or less, preferably 120 mgKOH/g or less, and more preferably 90 mgKOH/g or less. The acid value affects adhesiveness of the molded product to epoxy resins. The acid value can be measured by a method provided in JIS K 3504. Specifically, the acid value is measured as the number of milligrams of potassium hydroxide needed to neutralize free fatty acids contained in 1 g of a wax. The acid value is measured in the same manner in the examples described below. The olefin wax (C) used in the invention has a high acid value compared to waxes usually used as releasing agents for polyarylene sulfide resins. Accordingly, the olefin wax (C) is preferable since the olefin wax (C) bleeding into the surface of the molded product exhibits a good mold releasing effect and improves adhesiveness to epoxy resins.

The dropping point of the olefin wax (C) used in the invention is preferably 50° C. or more, more preferably 60° C. or more, and further preferably 70° C. or more. The dropping point is preferably 100° C. or less, more preferably 90° C. or less, and further preferably 80° C. or less. The dropping point can be measured by a method provided in ASTM D127. Specifically, the dropping point is measured as a temperature at which a first drop of a molten wax falls from a metal nipple. The dropping point is measured in the same manner in the examples below. When the dropping point is within the above-described range, the olefin wax (C) improves the mold releasing property of the molded product from a mold and has good effects on the continuous molding property. Moreover, bleeding of the olefin wax (C) into the surface of the molded product easily occurs within the above-mentioned range. Further, during melt-kneading of the polyarylene sulfide resin composition, the olefin wax (C) melts sufficiently. As a result, the olefin wax (C) substantially uniformly disperses in the molded product. Accordingly, segregation of the olefin wax (C) in the surface of the molded product is suppressed and soiling of the mold and deterioration of the appearance of the molded product can be reduced.

The blending ratio of the olefin wax (C) in the polyarylene sulfide resin composition is, with respect to 100 parts by mass of the polyarylene sulfide resin (A), 0.01 parts by mass or more, preferably 0.05 parts by mass or more, more preferably 0.1 parts by mass or more from the viewpoints of suppressing deterioration of epoxy adhesiveness, especially deterioration of epoxy resin adhesiveness after an annealing treatment, as well as exhibiting excellent mold releasing property of the molded product from the mold, and is 10 parts by mass or less, preferably 5 parts by mass or less, and more preferably 3 parts by mass or less from the viewpoints of suppressing soiling of the mold during molding and deterioration of the appearance of the molded product.

The molecular weight (Mw) is determined by a GPC measurement method using the following conditions.

Measuring device: "HLC-8320 GPC" manufactured by Tosoh Corporation

Column: Guard column "HXL-L" manufactured by Tosoh Corporation+"TSK-GEL G1000HXL" manufactured by Tosoh Corporation+"TSK-GEL G2000HXL" manufactured by Tosoh Corporation+"TSK-GEL G3000HXL" manufactured by Tosoh Corporation+"TSK-GEL G4000HXL" manufactured by Tosoh Corporation Detector: RI (differential refractometer)

Data processing: "GPC-8020 Model II Version 4.10" manufactured by Tosoh Corporation Column temperature: 40° C.

Developing solvent: tetrahydrofuran

Flow velocity: 1.0 ml/min

Standard sample: The following monodispersed polystyrenes with known molecular weights were used in accordance with the measurement manual of the aforementioned "GPC-8020 Model II Version 4.10".

Monodispersed Polystyrenes:
"A-500" manufactured by Tosoh Corporation
"A-2500" manufactured by Tosoh Corporation
"F-1" manufactured by Tosoh Corporation
"F-4" manufactured by Tosoh Corporation
"F-20" manufactured by Tosoh Corporation
"F-128" manufactured by Tosoh Corporation
"F-380" manufactured by Tosoh Corporation Measurement sample: The sample (50 µl) was obtained by dissolving 1 mg of resin (solvent-soluble component) in 1 ml of tetrahydrofuran and then filtering through a microfilter (pore size 0.45 µm).

The polyarylene sulfide resin composition of the invention may contain a glass flake (D) as an optional component.

As the glass flake used in the invention, known glass flakes can be used as long as they are scale-like glass fillers. Among these glass flakes, a scale-like glass having an average particle size in a range of 10 µm to 4000 µm, and/or an average thickness of 0.1 µm to 20 µm is preferable. From the viewpoint of excellent moisture permeation resistance and surface appearance, a scale-like glass having an average particle size in a range of 100 µm to 300 µm, and/or an average thickness of 2 µm to 10 µm is preferable.

In the invention, average particle size and average thickness refer to a particle size at 50% cumulative degree in a cumulative particle size distribution curve determined by laser diffractometry.

The glass flakes used in the invention are preferably those that have been pretreated with a silane coupling agent or the like.

By using and dispersing the scale-like glass flake in the molded article, the invention can reduce the linear expansion coefficients in a flowing direction and a perpendicular direction, and can improve the resistance to thermal shock caused by repetition of low temperature and high temperature.

Although the glass flake is an optional component, when it is blended, from the viewpoints of suppressing deterioration of epoxy resin adhesiveness, especially deterioration of epoxy resin adhesiveness after an annealing treatment, and improving heat resistance, mechanical strength, especially thermal shock resistance and dimensional stability, the blending ratio is preferably, with respect to 100 parts by mass of the polyarylene sulfide resin, 1 part by mass or more, more preferably 20 parts by mass or more, and further preferably 30 parts by mass or more. On the other hand, from the viewpoint of improving flowability, the blending ratio of the glass flake is preferably 250 parts by mass or less, more preferably 100 parts by mass or less, and further preferably 80 parts by mass or less.

The polyarylene sulfide resin composition used in the invention may further contain, as necessary, a filler (hereinafter simply referred to as "other fillers") as an optional component within a range that will not impair the effects brought by using the epoxy resin (B) and the olefin wax (C). Any known conventional materials may be used as these other fillers as long as they do not impair the effects of the invention. For example, fillers having various shapes, such as fibrous materials and non-fibrous materials such as grainy materials and tabular materials, may be used. Specifically, fibrous fillers such as glass fibers, carbon fibers, silane-glass fibers, ceramic fibers, aramid fibers, metal fibers, potassium titanate fibers, silicon carbide fibers, calcium silicate fibers, wollastonite, and natural fibers may be used. Further, non-fibrous fillers such as glass beads, barium sulfate, clay, pyrophyllite, bentonite, sericite, mica, mica, talc, attapulgite, ferrite, calcium silicate, calcium carbonate, magnesium carbonate, glass beads, zeolite, milled fiber, and calcium sulfate may be used.

Other fillers are not essential components in the invention, and when added, the content of the other fillers is not particularly limited as long as the effects of the invention are not impaired. For example, the content of the other fillers is, with respect to 100 parts by mass of the polyarylene sulfide resin (A), preferably 1 part by mass or more, more preferably 10 parts by mass or more, and preferably 600 parts by mass or less, and more preferably 200 parts by mass or less. In such ranges, the resin composition has good mechanical strength and moldability and thus is preferable.

The polyarylene sulfide resin composition used in the invention may contain, as necessary, a silane coupling agent as an optional component within a range that will not impair the effects brought by using the epoxy resin (B) and the olefin wax (C). The silane coupling agent is not particularly limited as long as the effects of the invention are not impaired. However, a silane coupling agent having a functional group, for example, an epoxy group, an isocyanato group, an amino group, or a hydroxyl group, which reacts with a carboxyl group, a thiol group, or a salt thereof at the terminal of the polyarylene sulfide resin is preferable. Examples of such a silane coupling agent include epoxy-group-containing alkoxysilane compounds such as γ-glycidoxypropyltrimethoxysilane, γ-glycidoxypropyltriethoxysilane, and β-(3,4-epoxycyclohexyl)ethyltrimethoxysilane, isocyanato-group-containing alkoxysilane compounds such as γ-isocyanatopropyltrimethoxysilane, γ-isocyanatopropyltriethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane, and γ-isocyanatopropyltrichlorosilane, amino-group-containing alkoxysilane compounds such as γ-(2-aminoethyl)aminopropylmethyldimethoxysilane, γ-(2-aminoethyl)aminopropyltrimethoxysilane, and γ-aminopropyltrimethoxysilane, hydroxyl-group-containing alkoxysilane compounds such as γ-hydroxypropyltrimethoxysilane and γ-hydroxypropyltriethoxysilane. These alkoxysilane compounds are preferable because they can react with a polyarylene sulfide polymer via a functional group and increase the apparent molecular weight. Although the silane coupling agent is not an essential component in the invention, when the silane coupling agent is added, the blending amount thereof is not particularly limited as long as the effects of the invention are not impaired. However, the amount of the coupling agent is preferably 0.01 parts by mass or more, more preferably 0.1 parts by mass or more, and preferably 10 parts by mass or less, and more preferably 5 parts by mass or less with respect to 100 parts by mass of the polyarylene sulfide resin (A). In such ranges, the resin composition is preferable because it has good corona resistance and moldability, particularly mold releasability, and the molded article shows improved mechanical strength while exhibiting excellent adhesiveness to the epoxy resin.

The polyarylene sulfide resin composition used in the invention may contain, as necessary, a thermoplastic elastomer as an optional component within a range that will not impair the effects brought by using the epoxy resin (B) and the olefin wax (C). Examples of the thermoplastic elastomer include polyolefin-based elastomers, fluoroelastomers, and silicone-based elastomers, and among them, polyolefin-based elastomers are preferable. When these elastomers are added, the content thereof is not particularly limited as long as the effects of the invention are not impaired. However, the content is preferably 0.01 parts by mass or more, more preferably 0.1 parts by mass or more, and preferably 10 parts by mass or less, and more preferably 5 parts by mass or less with respect to 100 parts by mass of the polyarylene sulfide resin (A). In such ranges, the obtained polyarylene sulfide resin composition is preferable because the impact resistance of the polyarylene sulfide resin composition is improved.

The aforementioned polyolefin-based elastomer may be obtained by, for example, homopolymerization of α-olefin or copolymerization of different α-olefins, and further, when a functional group is imparted, by copolymerization of α-olefin and a vinyl polymerizable compound having a functional group. Examples of the α-olefin include those having 2 to 8 carbon atoms such as ethylene, propylene, and butane-1. Further, examples of the functional group include a carboxyl group, an acid anhydride group represented by formula —(CO)O(CO)—, an ester thereof, an epoxy group, an amino group, a hydroxyl group, a mercapto group, an isocyanate group, and an oxazoline group.

Specific examples of the vinyl polymerizable compound having a functional group include α,β-unsaturated carboxylic acid such as (meth) acrylic acid and (meth) acrylic acid ester and alkyl esters thereof, a maleic acid, a fumaric acid, an itaconic acid, and other α,β-unsaturated dicarboxylic acids having 4 to 10 carbon atoms as well as derivatives thereof (mono- or diesters, and acid anhydrides thereof, etc.), and glycidyl(meth)acrylate. Among them, ethylene-propylene copolymers and ethylene-butene copolymers having at least one functional group selected from the group consisting of the aforementioned epoxy group, carboxyl group, and acid anhydride group are preferable from the viewpoint of improving the mechanical strength, especially toughness and impact resistance.

Further, the polyarylene sulfide resin composition used in the invention may contain, as appropriate according to the usage, a synthetic resin as an optional component within a range that will not impair the effects brought by using the epoxy resin (B) and the olefin wax (C). Examples of the synthetic resin include a polyester resin, a polyamide resin, a polyimide resin, a polyetherimide resin, a polycarbonate resin, a polyphenylene ether resin, a polysulfone resin, a polyethersulfone resin, a polyether ether ketone resin, a polyether ketone resin, a polyarylene resin, a polyethylene resin, a polypropylene resin, a polyethylene tetrafluoride resin, a polyethylene difluoride resin, a polystyrene resin, an ABS resin, a urethane resin, and a liquid crystal polymer. In addition, the blending amount of these resins differs depending on respective purposes and cannot be unconditionally specified. However, these resins may be used in an amount appropriately adjusted within the following range, that is, preferably 0.01 parts by mass or more, more preferably 0.1 parts by mass or more, further preferably 1 part by mass or more, and preferably 1000 parts by mass or less, more preferably 500 parts by mass or less, and further preferably 100 parts by mass or less with respect to 100 parts by mass of the polyarylene sulfide resin (A), according to purposes or usages as long as the effects of the invention are not impaired.

Moreover, the polyarylene sulfide resin composition used in the invention may further contain, as necessary, a known conventional additive as an optional component within a range that will not impair the effects brought by using the epoxy resin (B) and the olefin wax (C). Examples of the known conventional additive include a colorant, an antistatic agent, an antioxidant, a heat resistance stabilizer, a UV stabilizer, a UV absorber, a foaming agent, a flame retardant, a flame retardant promoter, an anti-rust agent, and a mold releasing agent other than the olefin wax (C) (hereinafter simply referred to as "other releasing agents"). These additives are not essential components, and may be used in an amount appropriately adjusted within a range of preferably 0.01 parts by mass to 1000 parts by mass or less with respect to 100 parts by mass of the polyarylene sulfide resin (A), according to purposes or usages as long as the effects of the invention are not impaired.

Examples of the other mold releasing agents include natural waxes such as carnauba wax, metal salts of higher fatty acids such as zinc stearate, and polyolefin waxes such as oxidized or non-oxidized polyethylene wax.

The polyarylene sulfide resin composition used in the invention may be produced by a method including a step of melt-kneading the polyarylene sulfide resin (A), the epoxy resin (B), and the olefin wax (C) as essential components at a temperature equal to or higher than the melting point of the polyarylene sulfide resin (A).

An example of a preferable method for producing the polyarylene sulfide resin composition used in the invention includes the following: dry-blending the essential components, that is, the polyarylene sulfide resin (A), the epoxy resin (B), and the olefin wax (C) in the aforementioned contents, with the aforementioned optional components such as the other fillers and additives as necessary, in various forms such as powder, pellets, and chips, in a ribbon blender, a Henschel mixer, a V blender, etc., and then melt-kneading the resulting mixture by a known melt kneader such as a Banbury mixer, a mixing roll, a single-screw or twin-screw extruder, and a kneader, wherein the resin temperature is set to be equal to or higher than the melting point of the polyarylene sulfide resin, preferably equal to or higher than the melting point+10° C., more preferably equal to or higher than the melting point+10° C., further preferably equal to or higher than the melting point+20° C., and preferably equal to or lower than the melting point+100° C., more preferably equal to or lower than the melting point+50° C. The components may be added to and mixed in the melt kneader at the same time or separately.

The melt kneader is preferably a twin-screw kneading extruder from the viewpoint of dispersibility and productivity. For example, it is preferable to melt-knead while appropriately adjusting a discharge rate of the resin component in a range of 5 (kg/hr) to 500 (kg/hr) and a screw rotation speed in a range of 50 (rpm) to 500 (rpm), and it is more preferable to melt-knead under a condition that the ratio thereof (discharge rate/screw rotation speed) is in a range of 0.02 (kg/hr/rpm) to 5 (kg/hr/rpm). Further, when a filler or an additive is added among the aforementioned components, it is preferable to put the filler or the additive into the extruder from a side feeder of the twin-screw kneading extruder from the viewpoint of dispersibility. As to the position of the side feeder, the ratio of the distance from an extruder resin input portion to the side feeder to the total screw length of the twin-screw kneading extruder is preferably 0.1 or more, more preferably 0.3 or more, and preferably 0.9 or less, more preferably 0.7 or less.

The polyarylene sulfide resin composition used in the invention obtained by melt-kneading in this way is a melt mixture containing the polyarylene sulfide resin (A), the epoxy resin (B), and the olefin wax (C) as essential components, as well as optional components which are added as needed and components derived therefrom. It is preferable that, after the melt-kneading, the melt mixture is processed into pellets, chips, granules, powder, etc. by a known method, then pre-dried at a temperature of 100° C. to 150° C. as needed, and is subjected to various moldings.

The polyarylene sulfide resin composition used in the invention produced by the aforementioned producing method has morphology in which the polyarylene sulfide resin is used as a matrix, and the epoxy resin (B) and the olefin wax (C), which are the essential components, components derived therefrom, as well as optional components added as needed are dispersed in the matrix. As a result, the polyarylene sulfide resin molded article has excellent epoxy resin adhesiveness, and in particular, suppresses the deterioration of the epoxy resin adhesiveness after an annealing treatment. Further, the polyarylene sulfide resin molded article has mechanical strength and flame retardancy, and has excellent flowability since it reduces the gas generation amount during melting of the polyarylene sulfide resin composition and suppresses thickening during melt-molding.

The molded article of the invention can be obtained by melt-molding the polyarylene sulfide resin composition. A general method may be used for melt-molding, and the polyarylene sulfide resin composition may be subjected to various molding methods such as injection molding, compression molding, extrusion molding involving forming composites, sheets, and pipes, pultrusion, blow-molding, and transfer-molding. However, it is particularly suitable for injection molding usage since it has an excellent mold releasing property. In the case of molding by injection molding, the molding conditions are not particularly limited and molding can usually be performed by a general method. For example, in an injection molding machine, the polyarylene sulfide resin composition may be subjected to a melting step where the resin temperature is set to be equal to or higher than the melting point of the polyarylene sulfide resin, preferably equal to or higher than the melting point+10° C., more preferably equal to or higher than the melting point+10° C., further preferably equal to or higher than the melting point+20° C., and preferably equal to or lower than the melting point+100° C., more preferably equal to or lower than the melting point+50° C., and then be injected into a mold from a resin discharge port for molding. In this case, the mold temperature may also be set in a known temperature range, for example, room temperature (23° C.) or higher, preferably 120° C. or higher, and preferably 300° C. or lower, more preferably 180° C. or lower.

The molded article obtained by molding the polyarylene sulfide resin composition used in the invention can suppress the deterioration of the epoxy resin adhesiveness, especially deterioration of the epoxy resin adhesiveness after an annealing treatment, and also has excellent mechanical strength and flame retardancy.

The polyarylene sulfide resin molded article used in the invention has excellent adhesiveness to a curable resin composition containing an epoxy resin. Here, the curable resin composition containing an epoxy resin is preferably a composition obtained by mixing an epoxy resin with a curing agent.

The epoxy resin used in the invention is not particularly limited as long as the effects of the invention are not impaired, and examples thereof include a bisphenol type epoxy resin, a novolac type epoxy resin, and an epoxy resin having a polyarylene ether structure (α). Among these resins, the bisphenol type epoxy resin is preferable because it has excellent adhesiveness.

Examples of the epoxy resin of the bisphenol type epoxy resin include bisphenol type glycidyl ethers, and specific examples thereof include a bisphenol A type epoxy resin, a bisphenol F type epoxy resin, a biphenyl type epoxy resin, a tetramethylbiphenyl type epoxy resin, a bisphenol S type epoxy resin, a bisphenol AD type epoxy resin, and a tetrabromobisphenol A type epoxy resin.

Further, examples of the novolac type epoxy resin include novolac type epoxy resins that are produced by reacting, with epi-halohydrin, a novolac type phenol resin produced by a condensation reaction of a phenol and an aldehyde. Specific examples of the novolac type epoxy resins include a phenol novolac type epoxy resin, a cresol novolac type epoxy resin, a naphthol novolac type epoxy resin, a naphthol-phenol co-condensation novolac type epoxy resin, a naphthol-cresol co-condensation novolac type epoxy resin, and a brominated phenol novolac type epoxy resin.

These epoxy resins contained in the curable resin composition used in the invention are preferably used after undergoing a curing reaction with a curing agent. The curing agent is not particularly limited as long as it is generally used as a curing agent for epoxy resins. Examples of the curing agent include an amine type curing agent, a phenol resin type curing agent, an acid anhydride type curing agent, and a latent curing agent.

As the amine type curing agent, a known one can be used, and examples thereof include aliphatic polyamines, aromatic polyamines, heterocyclic polyamines and the like, and epoxy adducts, Mannich modified products, and polyamide modified products thereof. Specific examples include diethylene triamine, triethylene tetraamine, tetraethylene pentamine, m-xylene diamine, trimethylhexamethylene diamine, 2-methylpentamethylene, isophorone diamine, 1,3-bisaminomethylcyclohexane, bis(4-aminocyclohexyl)methane, norbornene diamine, 1,2-diaminocyclohexane, diaminodiphenylmethane, m-phenylenediamine, diaminodiphenylsulfone, diethyltoluenediamine, trimethylene bis(4-aminobenzoate), and polytetramethylene oxide-di-p-aminobenzoate. Of these, m-xylene diamine and 1,3-bisaminomethylcyclohexane are particularly preferable because they have excellent curability.

As the phenol resin type curing agent, a known one can be used, and examples thereof include bisphenols such as bisphenol A, bisphenol F, and biphenol, trifunctional phenolic compounds such as tri(hydroxyphenyl)methane and 1,1,1-tri(hydroxyphenyl)ethane, phenol novolac, and cresol novolac.

As the acid anhydride type curing agent, a known one can be used, and examples thereof include phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, and methylhexahydrophthalic anhydride.

Examples of the latent curing agent include dicyandiamide, imidazole, BF3-amine complex, and guanidine derivatives.

These curing agents may be used alone or in combination of two or more. In addition, it is also possible to use a curing accelerator in combination as appropriate as long as the effects of the invention are not impaired. Various types of curing accelerators can be used, and examples thereof include phosphorus compounds, tertiary amines, imidazoles, organic acid metal salts, Lewis acids, and amine complex salts.

The curable resin composition containing an epoxy resin used in the invention may be subjected to a curing reaction in the absence of a solvent, and may also be subjected to a curing reaction in the presence of a solvent such as benzene, toluene, xylene, ethyl acetate, acetone, methyl ethyl ketone, diethyl ether, tetrahydrofuran, methyl acetate, acetonitrile, chloroform, methylene chloride, carbon tetrachloride, 1,2- dichloroethane, 1,1,2-trichloroethane, tetrachloroethylene, N-methylpyrrolidone, isopropyl alcohol, isobutanol, and t-butyl alcohol.

In the curable resin composition used in the invention, the ratio of the epoxy resin and the curing agent used is one known and not particularly limited as long as the effects of the invention are not impaired. However, from the viewpoint of obtaining a cured product having excellent curability and excellent heat resistance and chemical resistance, the amount of the active group in the curing agent is preferably 0.7 to 1.5 equivalents with respect to a total 1 equivalent of the epoxy groups in the epoxy resin component.

The molded article obtained by molding the polyarylene sulfide resin composition used in the invention can suppress the deterioration of the epoxy resin adhesiveness, especially the deterioration of the epoxy resin adhesiveness even after an annealing treatment, and thus the molded article can be suitably used as a composite molded article formed by bonding with a cured product of a curable resin composition containing an epoxy resin.

A method for producing a composite molded article of the invention includes a step (1) of subjecting the molded article to an annealing treatment, and a step (2) of bonding the annealed molded article and the cured product to each other.

As mentioned above,

Step (1) is a step of annealing the "molded article obtained by molding the polyarylene sulfide resin composition" used in the invention. Although optimal conditions are selected for the annealing treatment depending on the usage or shape of the composite molded article, the annealing temperature is preferably 100° C. or higher, and more preferably 120° C. or higher. On the other hand, the annealing temperature is preferably 260° C. or lower, and more preferably 240° C. or lower. The annealing time is not particularly limited; however, it is preferably 0.5 hours or more, and more preferably 1 hour or more. On the other hand, the annealing time is preferably 10 hours or less, and more preferably 8 hours or less. The annealing treatment may be performed in air; however, it is preferably performed in an inert gas such as nitrogen gas.

Step (2) is a step of bonding the annealed molded article and the cured product to each other.

The bonding of the molded article and the cured product may be performed by a known method as long as the effects of the invention are not impaired, and examples thereof include a method including bringing the molded article annealed in step (1) into contact with a curable resin composition containing an epoxy resin, and curing the curable resin composition; and a method including melting a pre-annealed molded product by heating at least a part of a surface, preferably 50% or more of the surface, more preferably the entire surface of the molded product to be bonded with the curable resin composition during bonding, and then bringing the melted molded article into contact with the curable resin composition containing an epoxy resin and curing the curable resin composition. On the other hand, the curable resin composition can be cured by bringing the curable resin composition which is in an uncured state into contact with the molded article and then completely curing the curable resin composition, or, the curable resin composition can be completely cured by bringing the curable resin composition into a semi-cured state (so-called B stage state) and then bringing the curable resin composition into contact with the molded article.

The composite molded article of the invention obtained in this way can be used for various purposes. Main usage examples include electric and electronic parts such as housings for various home appliances, mobile phones, and electronic devices such as PCs (Personal Computers), protective and/or supporting members for box-type electric and electronic component integrated modules, multiple individual semiconductors or modules, sensors, LED lamps, connectors, sockets, resistors, relay cases, switches, coil bobbins, capacitors, variable capacitor cases, optical pickups, oscillators, various terminal boards, transformers, plugs, printed circuit boards, tuners, speakers, microphones, headphones, small motors, magnetic head bases, power modules, terminal blocks, semiconductors, liquid crystals, FDD carriages, FDD chasses, motor brush holders, parabolic antennas, and computer-related parts; VTR parts, television parts, irons, hair dryers, rice cooker parts, microwave oven parts, acoustic parts, audio and/or video equipment parts such as audio laser disks, compact disks, DVD disks, and Blu-ray disks, home and office electric appliance parts such as lighting parts, refrigerator parts, air-conditioner parts, typewriter parts, word-processor parts, and water-related equipment parts of water heaters, bath water volume, temperature sensors, etc.; machine-related parts such as office computer-related parts, phone-related parts, facsimile-related parts, copier-related parts, cleaning jigs, motor parts, lighters, and typewriters; optical instrument and precision instrument-related parts such as microscopes, binoculars, cameras, and watches; and automobile and vehicle-related parts such as alternator terminals, alternator connectors, brush holders, slip rings, IC regulators, potentiometer bases for light dimmers, relay blocks, inhibitor switches, various valves such as exhaust gas valves, various fuel-related, exhaust-system, and intake-system pipes, air intake nozzle snorkels, intake manifolds, fuel pumps, engine coolant joints, carburetor main bodies, carburetor spacers, exhaust gas sensors, coolant sensors, oil temperature sensors, brake pad wear sensors, throttle position sensors, crankshaft position sensors, airflow meters, brake pad wear sensors, air-conditioner thermostat bases, heater hot air flow control valves, brush holders for radiator motors, water-pump impellers, turbine vanes, wiper motor-related parts, distributors, starter switches, ignition coils and bobbins thereof, motor insulators, motor rotors, motor cores, starter relays, wire harnesses for transmission, window washer nozzles, air-conditioning panel switch boards, coils for fuel-related electromagnetic valves, connectors for fuses, horn terminals, insulating plates for electric parts, step motor rotors, lamp sockets, lamp reflectors, lamp housings, brake pistons, solenoid bobbins, engine oil filters, ignition device cases, and cases for storing power modules, inverters, power devices, intelligent power modules, insulated gate bipolar transistors, power control units, reactors, converters, capacitors, insulators, motor terminal blocks, batteries, electric compressors, battery current sensors, junction blocks, and ignition coils for DLI systems. The composite molded article of the invention can also be applied to various other uses.

EXAMPLES

The invention will be described in more detail below with specific examples. Unless otherwise specified, parts and % are based on mass. In addition, analyses of resins produced in production examples were respectively conducted under the following conditions.

(Examples 1 to 8 and Comparative Examples 1 to 6) Production of PPS Resin Composition Materials were uniformly mixed in a tumbler in accordance with the compositions and contents described in Tables 1 to 3. Then the blended materials were placed in a twin-screw extruder "TEM-35B" equipped with a vent produced by Toshiba Machine Co., Ltd. and melt-kneaded at a resin component discharge rate of 25 kg/hr, a screw rotation speed of 200 rpm, a ratio of the resin component discharge rate (kg/hr) to the screw rotation speed (rpm) (discharge rate/screw rotation speed)=0.1 (kg/hr-rpm), and a resin temperature setting of 320° C. to obtain pellets of the resin composition. The following bonding test was conducted using the pellets. Results of the test and evaluation are shown in Tables 1 to 3.

(Measurement Example 1a) Bonding Strength Between PPS Molded Article (without Annealing Treatment) and Epoxy Resin Next, the resulting pellets were fed to an injection molding machine (SE75D-HP) produced by Sumitomo Heavy Industries, Ltd. whose cylinder temperature was set to 310° C. and injection molding was conducted with a die for forming an ASTM Type 1 dumbbell specimen at a die temperature of 140° C. As a result, an ASTM Type 1 dumbbell specimen was obtained. Then, the ASTM Type 1 dumbbell specimen was divided into two equal pieces from the center, masked with a fluororesin adhesive tape (Teflon (registered trademark) tape) (thickness: 0.08 mm) to have a contact area of 170 mm² with an epoxy adhesive, and was coated with an epoxy resin (two-component epoxy resin produced by Nagase ChemteX Corporation, main agent: XNR5002, curing agent: XNH5002, main agent/curing agent blend ratio=100:90) (coating area: 12.9 mm×12.9 mm). The other side was attached to the coated surface, fixed using a clip, and was heated in a hot air dryer set at 135° C. for 3 hours to cure and bond. After cooling at 23° C. for 1 day, the spacer was removed to obtain the specimen. The tensile strength at fracture of the resulting specimen was measured by using a tensile tester produced by Instron at a strain rate of 5 mm/min and a span of 60 mm at 23° C. The tensile strength was divided by the bonding area and the result was taken as the epoxy bonding strength (MPa).

(Measurement Example 1b) Bonding Strength Between PPS Molded Article (with Annealing Treatment) and Epoxy Resin After the ASTM Type 1 dumbbell specimen was obtained, the epoxy bonding strength (MPa) was measured in the same manner as in (Measurement Example 1a) except that the obtained ASTM Type 1 dumbbell specimen was annealed in an oven at 175° C. for 3 hours.

TABLE 1

| | Examples | | | |
|---|---|---|---|---|
| | 1 | 2 | 3 | 4 |
| A-1 | 39.5 | 39.5 | 39.5 | 39.5 |
| A-2 | | | | |
| A-3 | | | | |
| B-1 | 6.0 | 6.0 | 2 | 10 |
| B-2 | | | | |
| C-1 | 0.5 | | 0.5 | 0.5 |
| C-2 | | 0.5 | | |
| c-3 | | | | |
| c-4 | | | | |
| D-1 | | | | |
| D-2 | | | | |
| E-1 | | | | |
| Evaluation item | | | | |
| Without annealing Bonding strength (MPa) | 14.9 | 15.1 | 9.3 | 18.2 |
| With annealing Bonding strength (MPa) | 16.9 | 14.9 | 8.9 | 17.2 |
| Bonding strength change rate (with/without annealing) (%) | 113% | 99% | 96% | 95% |

TABLE 2

| | Examples | | | |
|---|---|---|---|---|
| | 5 | 6 | 7 | 8 |
| A-1 | 39.5 | 39.5 | | |
| A-2 | | | 39.5 | |
| A-3 | | | | 39.5 |
| B-1 | 6.0 | 6.0 | | |
| B-2 | | | 0.1 | 0.1 |
| C-1 | 0.1 | 1 | 0.5 | 0.5 |
| C-2 | | | | |
| c-3 | | | | |
| c-4 | | | | |
| D-1 | | | 25 | 25 |
| D-2 | 25 | 25 | | |
| E-1 | | | 5 | 5 |
| Evaluation item | | | | |
| Without annealing Bonding strength (MPa) | 8.8 | 12.1 | 4.9 | 5.1 |
| With annealing Bonding strength (MPa) | 7.4 | 10.5 | 4.3 | 4.5 |
| Bonding strength change rate (with/without annealing) (%) | 84% | 87% | 88% | 88% |

TABLE 3

| | Comparative Examples | | | | | |
|---|---|---|---|---|---|---|
| | 1 | 2 | 3 | 4 | 5 | 6 |
| A-1 | 39.5 | 39.5 | 39.5 | 39.5 | 39.5 | 39.5 |
| A-2 | | | | | | |
| A-3 | | | | | | |
| B-1 | 6.0 | 6.0 | | 0.05 | 6.0 | 6.0 |
| B-2 | | | | | | |
| C-1 | | | 0.5 | 0.5 | | |
| C-2 | | | | | | |
| c-3 | 0.5 | | | | | 0.5 |
| c-4 | | 0.5 | | | | |
| D-1 | | | | | | |
| D-2 | | | | | 25 | 25 |
| E-1 | | | | | | |
| Evaluation item | | | | | | |
| Without annealing Bonding strength (MPa) | 14.0 | 13.3 | 5.8 | 6.0 | 8.1 | 9.7 |
| With annealing Bonding strength (MPa) | 8.1 | 9.6 | 0.4 | 1.1 | 3.7 | 5.3 |
| Bonding strength change rate (with/without annealing (%) | 58% | 72% | 7% | 18% | 46% | 55% |

Ratios of the blended resins and materials in Tables 1 to 3 represent parts by mass, and the following materials were used.

Polyphenylene Sulfide Resin (A-1) A product produced according to the following (Production Example 1) was used.

(Production Example 1) Production of Polyphenylene Sulfide Resin (A-1)

[Step 1]

33.222 kg (226 mol) of p-dichlorobenzene (hereinafter abbreviated as "p-DCB"), 3.420 kg (34.5 mol) of NMP, 27.300 kg of 47.23 mass % NaSH aqueous solution (NaSH 228 mol), and 18.533 g of 49.21 mass % NaOH aqueous solution (NaOH 228 mol) were added into a 150 liter autoclave with a stirring blade connected to a pressure gauge, a thermometer, a condenser, a decanter, and a rectification column. The temperature was raised to 173° C. in 5 hours in a nitrogen gas atmosphere while stirring the mixture, and after 27.300 kg of water was distilled, the autoclave was sealed. The p-DCB distilled by azeotropy during dehydration was separated by the decanter and returned to the autoclave as soon as it was separated. In the autoclave after the completion of dehydration, an anhydrous sodium sulfide composition in a form of fine particles was in a state of being dispersed in p-DCB. Since the composition contained 0.079 kg (0.8 mol) of NMP, it was shown that 98 mol % (33.7 mol) of the added NMP was hydrolyzed to a sodium salt of a ring-opened NMP (4-(methylamino) butyric acid) (hereinafter abbreviated as "SMAB"). The amount of SMAB in the autoclave was 0.147 mol with respect to 1 mol of of sulfur atoms present in the autoclave. In the case where the total amount of the added NaSH and NaOH is changed to anhydrous $Na_2S$, the theoretical dehydration amount is 27.921 g. Accordingly, it was shown that, of 878 g (48.8 mol) of residual water in the autoclave, 609 g (33.8 mol) was consumed in the hydrolysis reaction between NMP and NaOH, and no longer existed in the autoclave as water; the remaining 269 g (14.9 mol) remained in the autoclave in a form of water or water of crystallization. The water content in the autoclave was 0.065 mol with respect to 1 mol of sulfur atoms present in the autoclave.

[Step 2]

After completion of the dehydration step, the internal temperature was cooled to 160° C., 46.343 kg (467.5 mol) of NMP was added and the temperature was raised to 185° C. The water content in the autoclave was 0.025 mol with respect to 1 mol of NMP added in step 2. When the gauge pressure reached 0.00 MPa, a valve connected to the rectification column was opened and the internal temperature was raised to 200° C. in 1 hour. At this time, cooling and valve opening degree were controlled such that the temperature at the outlet of the rectification column was 110° C. or lower. Distilled mixed steam of p-DCB and water was condensed by the condenser, separated by the decanter, and p-DCB was returned to the autoclave. The amount of distilled water was 228 g (12.7 mol).

[Step 3]

The water content in the autoclave at the start of step 3 was 41 g (2.3 mol), which was 0.005 mol with respect to 1 mol of NMP added in step 2, and 0.010 mol with respect to 1 mol of sulfur atoms present in the autoclave. The amount of SMAB in the autoclave was the same as in step 1, that is, 0.147 mol with respect to 1 mol of sulfur atoms present in the autoclave. Then, the internal temperature was raised from 200° C. to 230° C. in 3 hours, and after stirring at 230° C. for 1.5 hours, the temperature was raised to 250° C. and the mixture was stirred for 1 hour. The gauge pressure at an internal temperature of 200° C. was 0.03 MPa, and the final gauge pressure was 0.40 MPa. After cooling, 650 g of the obtained slurry was added with 3 liters of water and was stirred at 80° C. for 1 hour, and was then filtered. The resulting cake was again added with 3 liters of warm water and stirred for 1 hour, and was filtered after washing. This operation was repeated 4 times. The cake was again added with 3 liters of warm water and acetic acid, and was stirred for 1 hour after being adjusted to pH 4.0. After washing, the mixture was filtered. This cake was again added with 3 liters of warm water and stirred for one hour, and was filtered after washing. This operation was repeated twice. The mixture was dried overnight at 120° C. using a hot air dryer to obtain a white powdery PPS resin (A-1). The melt viscosity of this polymer at 300° C. was 73 Pa·s. The non-Newton index was 1.07.

(A-2) A product produced according to the following (Production Example 2) was used.

Production Example 2

A white powdery PPS resin (herein after referred to as A-2) was obtained in the same manner as in Production Example 1 except that the part "then, the internal temperature was raised from 200° C. to 230° C. in 3 hours, and after stirring at 230° C. for 1.5 hours, the temperature was raised to 250° C. and the mixture was stirred for 1 hour" was changed into "then, the internal temperature was raised from 200° C. to 230° C. in 3 hours, and after stirring at 230° C. for 1 hour, the temperature was raised to 250° C. and the mixture was stirred for 1 hour". The melt viscosity of the obtained polymer was 41 Pa·s, and the non-Newton index was 1.07.

(A-3) A product produced according to the following (Production Example 3) was used.

Production Example 3

19.413 kg of flake-shaped sodium sulfide (60.3 mass % $Na_2S$) and 45.0 kg of NMP were added into a 150 liter autoclave with a stirring blade and a bottom valve connected to a pressure gauge, a thermometer, and a condenser. The temperature was raised to 209° C. while stirring the mixture in a nitrogen gas atmosphere to distill 4.644 kg of water (the remaining water content was 1.13 mol with respect to 1 mol of sodium sulfide). Then, the autoclave was sealed and cooled to 180° C., and 22.185 kg of paradichlorobenzene, 0.027 kg of 1,2,4-trichlorobenzene and 18.0 kg of NMP were added. A nitrogen gas was used at a liquid temperature of 150° C. to pressurize to 0.1 MPa gauge pressure to start raising the temperature. After keeping the liquid temperature at 240° C. for 2 hours, the reaction proceeded while stirring at a liquid temperature of 260° C. for 3 hours, and the upper portion of the autoclave was cooled by sprinkling water. Then, the temperature was lowered and the cooling of the upper portion of the autoclave was stopped. During cooling of the upper portion of the autoclave, the liquid temperature was kept constant without dropping. The maximum pressure during the reaction was 0.85 MPa. After the reaction, the mixture was cooled, and at a temperature of 170° C., a solution containing 0.284 kg (2.25 mol) of oxalic acid dehydrate in 0.663 kg of NMP was injected under pressure. After stirring for 30 minutes, the mixture was cooled, the bottom valve was opened at 100° C., and the reaction slurry was transferred to a 150 liter flat plate filter to pressure-filter at 120° C. Then, 16 kg of NMP was added and the mixture was pressure-filtered. After filtration, a 150 liter vacuum dryer with a stirring blade was used to remove NMP by stirring at 150° C. under reduced pressure for 2 hours to obtain a white powdery PPS resin (A-3). The melt viscosity of the polymer at 300° C. was 77 Pa·s, and the non-Newton index was 1.25.

Epoxy Resin (B-1): Epoxy resin "EPICLON 7050" produced by DIC Corporation (epoxy equivalent 1900 g/equivalent)

(B-2): Epoxy resin "EPICLON N-673" produced by DIC Corporation (epoxy equivalent 210 g/equivalent)

Wax (C-1): Polyethylene oxide wax ("LICOLUB CE2" produced by Clariant Japan K.K., acid value 84 mgKOH/g, dropping point 73° C., 100° C. melt viscosity 350 MPa)

(C-2): Polyethylene oxide wax ("DIACARNA" produced by Mitsui Chemical Corporation, acid value 100 mgKOH/g, dropping point 74° C., 100° C. melt viscosity 180 MPa)

(c-3): Maleic acid-modified polyethylene wax ("LICOCENE PE MA 4351" produced by Clariant Japan K.K., acid value 45 mgKOH/g, dropping point 123° C., 140° C. melt viscosity 250 MPa)

(c-4): Montanic acid ester wax ("LICOLUB WE40" produced by Clariant Japan K.K., acid value 20 mgKOH/g, dropping point 76° C., 100° C. melt viscosity 150 MPa)

Inorganic Filler (D-1): Glass flake ("REFG-301" produced by Nippon Sheet Glass Co., Ltd., average thickness 5 μm, average particle size 160 [μm])

(D-2): Glass fiber (glass fiber chopped strand having a fiber diameter of 10 μm and a length of 3 mm)

Other Resins (E-1): Ethylene-maleic anhydride-ethyl acrylate copolymer ("BONDINE AX8390" produced by Sumitomo Chemical Co., Ltd.)

The invention claimed is:

1. A method for producing a composite molded article obtained by bonding a molded article obtained by molding a polyarylene sulfide resin composition to a cured product produced from a curable resin composition containing an epoxy resin,
the method comprising a step (1) of subjecting the molded article to an annealing treatment, and a step (2) of bonding the annealed molded article and the cured product to each other,
wherein the polyarylene sulfide resin composition is obtained by blending and melt-kneading, as essential components, a polyarylene sulfide resin (A), an epoxy resin (B), and an olefin wax (C) containing a carboxyl group and a carboxylic acid anhydride group and having an acid value of 65 [mgKOH/g] to 150 [mgKOH/g], and
with respect to 100 parts by mass of the polyarylene sulfide resin (A), the content of the epoxy resin (B) is in a range of 1 to 250 parts by mass, and the content of the olefin wax (C) is in a range of 0.01 to 5 parts by mass.

2. The producing method according to claim 1, wherein the step (1) is a step of annealing in a range of 100° C. to 260° C.

3. The method for producing a composite molded article according to claim 2, wherein the step (2) is a step of bringing the curable resin composition containing an epoxy resin into contact with the molded article and then curing the curable resin composition.

4. The method for producing a composite molded article according to claim 3, wherein the polyarylene sulfide resin composition is obtained by blending the epoxy resin (B) such that an amount of epoxy groups per 1 g of the polyarylene sulfide resin composition is in a range of 1 [μmol] to 500 [μmol].

5. The method for producing a composite molded article according to claim 2, wherein the polyarylene sulfide resin composition is obtained by blending the epoxy resin (B) such that an amount of epoxy groups per 1 g of the polyarylene sulfide resin composition is in a range of 1 [μmol] to 500 [μmol].

6. The method for producing a composite molded article according to claim 1, wherein the step (2) is a step of bringing the curable resin composition containing an epoxy resin into contact with the molded article and then curing the curable resin composition.

7. The method for producing a composite molded article according to claim 6, wherein the polyarylene sulfide resin composition is obtained by blending the epoxy resin (B) such that an amount of epoxy groups per 1 g of the polyarylene sulfide resin composition is in a range of 1 [μmol] to 500 [μmol].

8. The method for producing a composite molded article according to claim 1, wherein the polyarylene sulfide resin composition is obtained by blending the epoxy resin (B) such that an amount of epoxy groups per 1 g of the polyarylene sulfide resin composition is in a range of 1 [μmol] to 500 [μmol].

9. A composite molded article obtained by bonding a molded article obtained by molding a polyarylene sulfide resin composition to a cured product produced from a curable resin composition containing an epoxy resin,
wherein the molded article is subjected to an annealing treatment;
the polyarylene sulfide resin composition is obtained by blending, as essential components, a polyarylene sulfide resin (A), an epoxy resin (B), and an olefin wax (C) containing a carboxyl group and a carboxylic acid anhydride group and having an acid value of 65 [mgKOH/g] to 150 [mgKOH/g]; and
with respect to 100 parts by mass of the polyarylene sulfide resin (A), a content of the epoxy resin (B) is in a range of 1 to 250 parts by mass, and a content of the olefin wax (C) is in a range of 0.01 to 5 parts by mass.

10. A polyarylene sulfide resin composition, which is obtained by blending, as essential components, a polyarylene sulfide resin (A), an epoxy resin (B), and an olefin wax (C) containing a carboxyl group and a carboxylic acid anhydride group and having an acid value of 65 [mgKOH/g] to 150 [mgKOH/g], wherein, with respect to 100 parts by mass of the polyarylene sulfide resin (A), a content of the epoxy resin (B) is in a range of 1 to 250 parts by mass, and a content of the olefin wax (C) is in a range of 0.01 to 5 parts by mass.

11. A molded article, which is obtained by molding the polyarylene sulfide resin composition according to claim 10.

12. The molded article according to claim 11, which is subjected to an annealing treatment.

13. A method for producing a polyarylene sulfide resin composition, comprising blending and melt-kneading, as essential components, a polyarylene sulfide resin (A), an epoxy resin (B), and an olefin wax (C) containing a carboxyl group and a carboxylic acid anhydride group and having an acid value of 65 [mgKOH/g] to 150 [mgKOH/g], wherein, with respect to 100 parts by mass of the polyarylene sulfide resin (A), a content of the epoxy resin (B) is in a range of 1 to 250 parts by mass, and a content of the olefin wax (C) is in a range of 0.01 to 5 parts by mass.

14. A method for producing a molded article, comprising melt-molding a polyarylene sulfide resin composition produced by the producing method according to claim 13.

15. A method for producing a molded article, comprising annealing a molded article produced by the producing method according to claim 14.

* * * * *